United States Patent
Von Reyher et al.

(10) Patent No.: US 8,319,663 B2
(45) Date of Patent: Nov. 27, 2012

(54) PARKING ASSIST SYSTEM

(75) Inventors: Alexander Von Reyher, Yokohama (JP);
Masafumi Naya, Yokohama (JP);
Hisashi Chiba, Yokohama (JP)

(73) Assignee: Bosch Corporation, Tokyo (JP)

( * ) Notice: Subject to any disclaimer, the term of this patent is extended or adjusted under 35 U.S.C. 154(b) by 397 days.

(21) Appl. No.: 12/741,940

(22) PCT Filed: Sep. 17, 2008

(86) PCT No.: PCT/JP2008/066731
§ 371 (c)(1),
(2), (4) Date: May 7, 2010

(87) PCT Pub. No.: WO2009/060663
PCT Pub. Date: May 14, 2009

(65) Prior Publication Data
US 2010/0259420 A1 Oct. 14, 2010

(30) Foreign Application Priority Data

Nov. 8, 2007 (JP) ................................. 2007-291066

(51) Int. Cl.
*B60Q 1/48* (2006.01)
*G05D 1/00* (2006.01)
*B60S 9/205* (2006.01)

(52) U.S. Cl. ..................... 340/932.2; 340/435; 340/436; 340/903; 340/425.5; 701/1; 701/41; 701/117; 348/148; 180/167; 180/199; 382/104

(58) Field of Classification Search ............... 340/932.2; 180/199
See application file for complete search history.

(56) References Cited

U.S. PATENT DOCUMENTS

| | | | | |
|---|---|---|---|---|
| 4,931,930 A | * | 6/1990 | Shyu et al. | 701/36 |
| 6,483,442 B2 | * | 11/2002 | Shimizu et al. | 340/932.2 |
| 7,088,262 B2 | * | 8/2006 | Schindler et al. | 340/932.2 |
| 7,706,944 B2 | * | 4/2010 | Tanaka et al. | 701/41 |
| 2006/0287825 A1 | | 12/2006 | Shimizu et al. | |
| 2008/0010018 A1 | | 1/2008 | Satonaka et al. | |

FOREIGN PATENT DOCUMENTS

| | | |
|---|---|---|
| JP | 5858483 A | 4/1983 |
| JP | 11105686 A | 4/1999 |

(Continued)

*Primary Examiner* — Donnie Crosland
(74) *Attorney, Agent, or Firm* — Michael Best & Friedrich LLP

(57) ABSTRACT

A parking assist system which, after a vehicle has passed the side of a parking area formed between parked vehicles, assists parking of the vehicle from a stopped position of the vehicle to the parking area, the parking assist system comprising: a distance sensor that emits radio waves or ultrasonic waves and detects the distance to the parked vehicles on the basis of the reflected waves; parking area detecting apparatus that measures, when the vehicle passes the parked vehicles and the side of the parking area, the distance to the parked vehicles with the distance sensor and detects, after the vehicle has passed the side of the parking area, the parking area on the basis of the measurement result; parking target position calculating apparatus that calculates a parking target position of the vehicle on the basis of the parking area that has been detected by the parking area detecting apparatus; and vehicle trajectory calculating apparatus that calculates, on the basis of the parking target position of the vehicle that has been calculated by the parking target position calculating apparatus, vehicle trajectories from a stopped position where the vehicle has stopped to the parking target position.

20 Claims, 10 Drawing Sheets

FOREIGN PATENT DOCUMENTS

| | | |
|---|---|---|
| JP | 11157404 A | 6/1999 |
| JP | 200110427 A | 1/2001 |
| JP | 200363337 A | 3/2003 |
| JP | 2005335568 A | 12/2005 |
| JP | 2006193014 A | 7/2006 |
| WO | 2007122861 A1 | 11/2007 |

\* cited by examiner

PARKING ASSIST SYSTEM

TECHNICAL FIELD

The present invention relates to a parking assist system that assists parking of a vehicle to a parking target position, for example, and relates to a parking assist system that detects a parking target position on the basis of a corner position of a parked vehicle.

BACKGROUND ART

Conventionally, there has been proposed a system that captures, with a camera (a rearview camera) that captures an image of the area behind the rear portion of a vehicle, an image of a parking space and displays the relative positional relationship between the vehicle and the parking space on the basis of the captured information (e.g., see patent document 1). This system converts the image captured by the rearview camera into a bird's-eye view image, detects the moving amount of the vehicle on the basis of vehicle signals, moves the bird's-eye view image in accordance with the moving amount of the vehicle, and creates an after-movement bird's-eye view image. Additionally, the system combines the after-movement bird's-eye view image with a newly read bird's-eye view image to create a composite bird's-eye view image, converts that bird's-eye view image into a projected image, and displays the projected image on the screen of a monitor. According to this system, a driver can always know the relative positional relationship between the vehicle and the parking space, so this system facilitates operations by the driver to park the vehicle in the parking space.

Further, conventionally, there is also a parking assist system which, by capturing an image of a parking area with a camera installed on the front of a vehicle, sets a parking target position of the vehicle and performs parking assistance from a stopped position of the vehicle to the parking target position.

Patent Document 1: JP-A-11-157404

DISCLOSURE OF THE INVENTION

Problem That the Invention is to Solve

In the parking assist system pertaining to patent document 1, the driver sets a parking location from the image captured by the rearview camera, but there is the problem that there are many distortions in the image captured by the rearview camera such that it is difficult for the driver to set the parking location. Further, there is the problem that the parking assist system is not suited for practical use because it takes time to set the parking location.

Further, in a system that captures an image of a parking area with a camera installed in the front of a vehicle to thereby set a parking target position of the vehicle, sometimes vehicle trajectories to the parking target position cannot be computed depending on the stopped position of the vehicle when the parking area is narrow and small (when there is no leeway in the width of the parking area with respect to the width of the system's own vehicle).

Further, in conventional parking assist systems, there has been the problem that error in the measurement of corner positions of parked vehicles is large.

The present invention has been made in view of the problems that the above-described conventional examples have and is aimed to provide a parking assist system that can easily set a parking area.

Further, another object of the present invention has been made in view of the problems that the above-described conventional examples have and is to provide a parking assist system that can reduce the amount of time required to set a parking area.

Further, still another object of the present invention has been made in view of the problems that the above-described conventional examples have and is to provide a parking assist system that can easily perform parking assistance even when a parking area is narrow and small.

Further, still another object of the present invention has been made in view of the problems that the above-described conventional examples have and is to reduce error in the measurement of a corner position of a parked vehicle.

Means for Solving the Problems

An aspect of the present invention for achieving the above-described objects is a parking assist system which, after a vehicle has passed the side of a parking area formed between parked vehicles, assists parking of the vehicle from a stopped position of the vehicle to the parking area, the parking assist system characterized by comprising a distance sensor, parking area detecting means, parking target position calculating means and vehicle trajectory calculating means. The distance sensor emits radio waves or ultrasonic waves and detects the distance to the parked vehicles on the basis of the reflected waves. The parking area detecting means measures, when the vehicle passes the parked vehicles and the side of the parking area, the distance to the parked vehicles with the distance sensor and detects, after the vehicle has passed the side of the parking area, the parking area on the basis of the measurement result. The parking target position calculating means calculates a parking target position of the vehicle on the basis of the parking area that has been detected by the parking area detecting means. The vehicle trajectory calculating means calculates, on the basis of the parking target position of the vehicle that has been calculated by the parking target position calculating means, vehicle trajectories from a stopped position where the vehicle has stopped to the parking target position.

This parking assist system has a configuration that detects the parking area on the basis of the measurement result of the distance sensor after the vehicle has passed the parking area, so it can accurately detect the parking area and setting of the parking area is easy.

Further, the parking assist system has a configuration that detects the parking area on the basis of the measurement result of the distance sensor after the vehicle has passed the parking area, so the burden of data processing is light in comparison to when an image of the parking area is captured with a camera, and the amount of time required to set the parking area can be shortened.

Further, the parking assist system has a configuration that detects the parking area on the basis of the measurement result of the distance sensor after the vehicle has passed the parking area, so the parking assist system can accurately measure corner positions of the parked vehicles.

Another aspect of the present invention for achieving the above-described object is a parking assist system which, while a vehicle is passing or after the vehicle has passed the side of a parking area formed between parked vehicles, assists parking of the vehicle from a stopped position of the vehicle to the parking area, the parking assist system characterized by comprising parking area detecting means, parking target position calculating means and vehicle trajectory calculating means. The parking area detecting means detects, while the vehicle is passing the parking area, the parking area by receiving from a driver the position of at least one of first and second corner portions positioned on the parking area side of two parked vehicles located on both sides of the parking area. The parking target position calculating means calculates a parking target position of the vehicle on the basis of the parking area that has been detected by the parking area detecting means. The vehicle trajectory calculating means calculates, on the basis of the parking target position of the vehicle that has been calculated by the parking target position calculating means, vehicle trajectories on which the vehicle is moved directly backward from a stopped position where the vehicle has stopped and is then guided to the parking target position.

This parking assist system has a configuration that detects the parking area on the basis of the measurement result of the distance sensor after the vehicle has passed the parking area, so it can accurately detect the parking area and setting of the parking area is easy.

Further, the parking assist system has a configuration that detects the parking area on the basis of the measurement result of the distance sensor after the vehicle has passed the parking area, so the burden of data processing is light in comparison to when an image of the parking area is captured with a camera, and the amount of time required to set the parking area can be shortened.

Further, after the vehicle has passed the side of the parking area and stopped, the parking assist system first moves the vehicle backward, then moves the vehicle forward (pokes the head of the vehicle out), and then moves the vehicle backward and guides the vehicle to the parking area, so there are few affects resulting from overhang and parking assistance is easy even when the parking area is narrow and small.

Another aspect of the present invention for achieving the above-described object is a parking assist system which, after a vehicle has passed the side of a parking area formed between parked vehicles, assists parking of the vehicle from a stopped position of the vehicle to the parking area, the parking assist system characterized by comprising parking area detecting means, parking target position calculating means and vehicle trajectory calculating means. The parking area detecting means detects the parking area while the vehicle is passing or after the vehicle has passed the side of the parking area. The parking target position calculating means calculates a parking target position of the vehicle on the basis of the parking area that has been detected by the parking area detecting means. The vehicle trajectory calculating means calculates, on the basis of the parking target position of the vehicle that has been calculated by the parking target position calculating means, vehicle trajectories on which the vehicle is moved directly backward from a stopped position where the vehicle has stopped and is then guided to the parking target position.

While the vehicle is passing or after the vehicle has passed the side of the parking area and stopped, this parking assist system first moves the vehicle backward, then moves the vehicle forward (pokes the head of the vehicle out), and then moves the vehicle backward and guides the vehicle to the parking area, so there are few affects resulting from overhang and parking assistance is easy even when the parking area is narrow and small.

Advantage of the Invention

According to the present invention, there can be provided a parking assist system that can easily set a parking area.

Further, according to the present invention, there can be provided a parking assist system that can reduce the amount of time required to set a parking area.

Further, according to the present invention, there can be provided a parking assist system that can easily perform parking assistance even when a parking area is narrow and small.

Further, according to the present invention, there can be provided a parking assist system that can reduce error in the measurement of a corner position of a parked vehicle.

DESCRIPTION OF THE REFERENCE NUMERALS AND SIGNS

1 Parking Assist ECU
1*b* Parking Target Position Calculating Unit (Parking Target Position Calculating Means)

2 Ultrasonic Sensors (Distance Sensors)
2a Front Side Ultrasonic Sensors
2b Front Ultrasonic Sensors
2c Rear Ultrasonic Sensors
2d Wheel Stop Distance Calculating Unit
3 Display Device
4 Wheel Stop Arrival Detection Sensors
4a Tire Pressure Sensors
5 Vehicle Sensors
6 Parking Switch
10 Parking Assist System
11 Vehicle LAN

BEST MODE FOR CARRYING OUT THE INVENTION

An outline of a hardware configuration of a parking assist system pertaining to an embodiment of the present invention will be described in detail below on the basis of FIG. 1.

Figure 1:
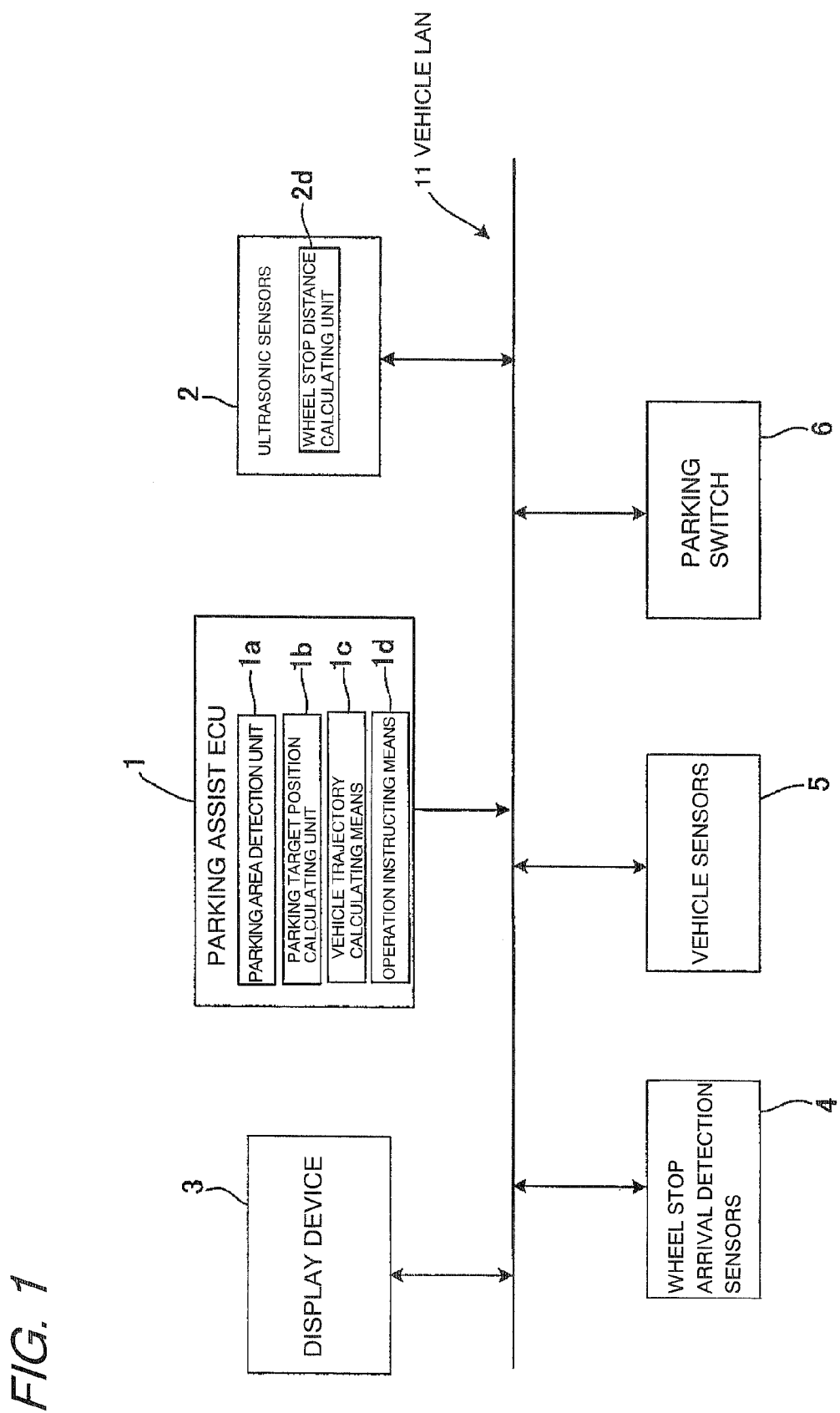
FIG. 1 is a general block diagram showing a hardware configuration of a parking assist system pertaining to an embodiment of the present invention.

A parking assist system 10 pertaining to the embodiment of the present invention is mainly equipped with a parking assist ECU 1 that controls parking assistance of a vehicle, plural (e.g., ten) ultrasonic sensors 2 that are distance sensors that detect objects around the vehicle, a display device 3, wheel stop arrival detection sensors 4 that detect the arrival of wheels at wheel stops, vehicle sensors 5 that detect state quantities of the vehicle, and a parking switch 6 (FIG. 1).

The parking assist ECU (Electronic Control Unit) 1, the ultrasonic sensors 2, the display device 3, the wheel stop arrival detection sensors 4, the vehicle sensors 5 and the parking switch 6 are interconnected via a vehicle LAN (Local Area Network) 11, for example, such that bidirectional data communication can be performed. This bidirectional data communication is, for example, performed on the basis of CAN (Controller Area Network) protocol that is a well-known technology.

The main hardware configuration of the parking assist ECU 1 is, for example, configured from a CPU (Central Processing Unit) that performs arithmetic processing, control processing, etc., a ROM (Read Only Memory) in which control programs, etc. are stored, and a RAM (Random Access Memory) that temporarily stores data. The CPU, the ROM and the RAM are interconnected via a data bus, for example.

The parking assist ECU 1 performs, for example, various types of parking assistance for parking the parking assist system's own vehicle in a parking target position. More specifically, operation instructing means 1d of the parking assist ECU 1 performs display control that displays on the display device 3 vehicle operations—that is, operation contents, operation amounts, operation directions (steering wheel steering angle, vehicle velocity, brakes ON/OFF, shift lever operation (reverse position R, drive position D)), etc.—that guide the parking assist system's own vehicle to the parking target position. Consequently, a driver can easily park the parking assist system's own vehicle in the parking target position by performing the vehicle operations in accordance with the vehicle operation instructions displayed on the display device 3.

Figure 3A:
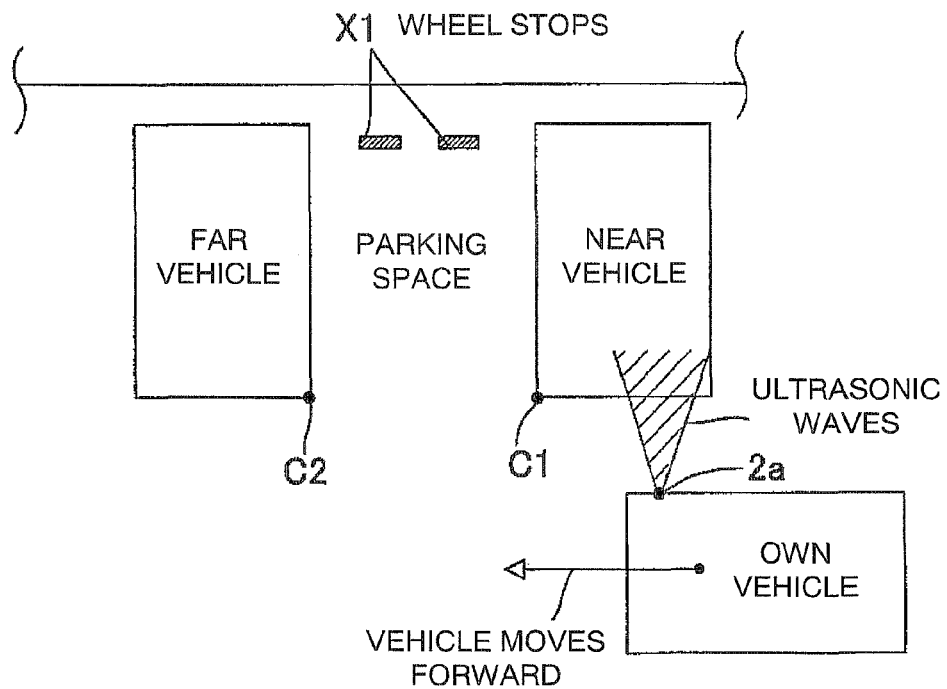
FIG. 3A is a diagram showing an example of a state of measuring a parking area having the potential for the parking assist system's own vehicle to park in while moving the parking assist system's own vehicle forward.

The parking assist ECU 1 has a parking target position calculating unit 1b that calculates a parking target position Y5 (see FIG. 3H) into which the own vehicle can back and park. When the parking assist system's own vehicle passes in front of a parking space (a parking area) formed between two vehicles that are already parked, for example, the ultrasonic sensors 2 can detect the depth and the width of the parking space by emitting ultrasonic waves into the parking space (FIGS. 3B to 3D).

Figure 2:
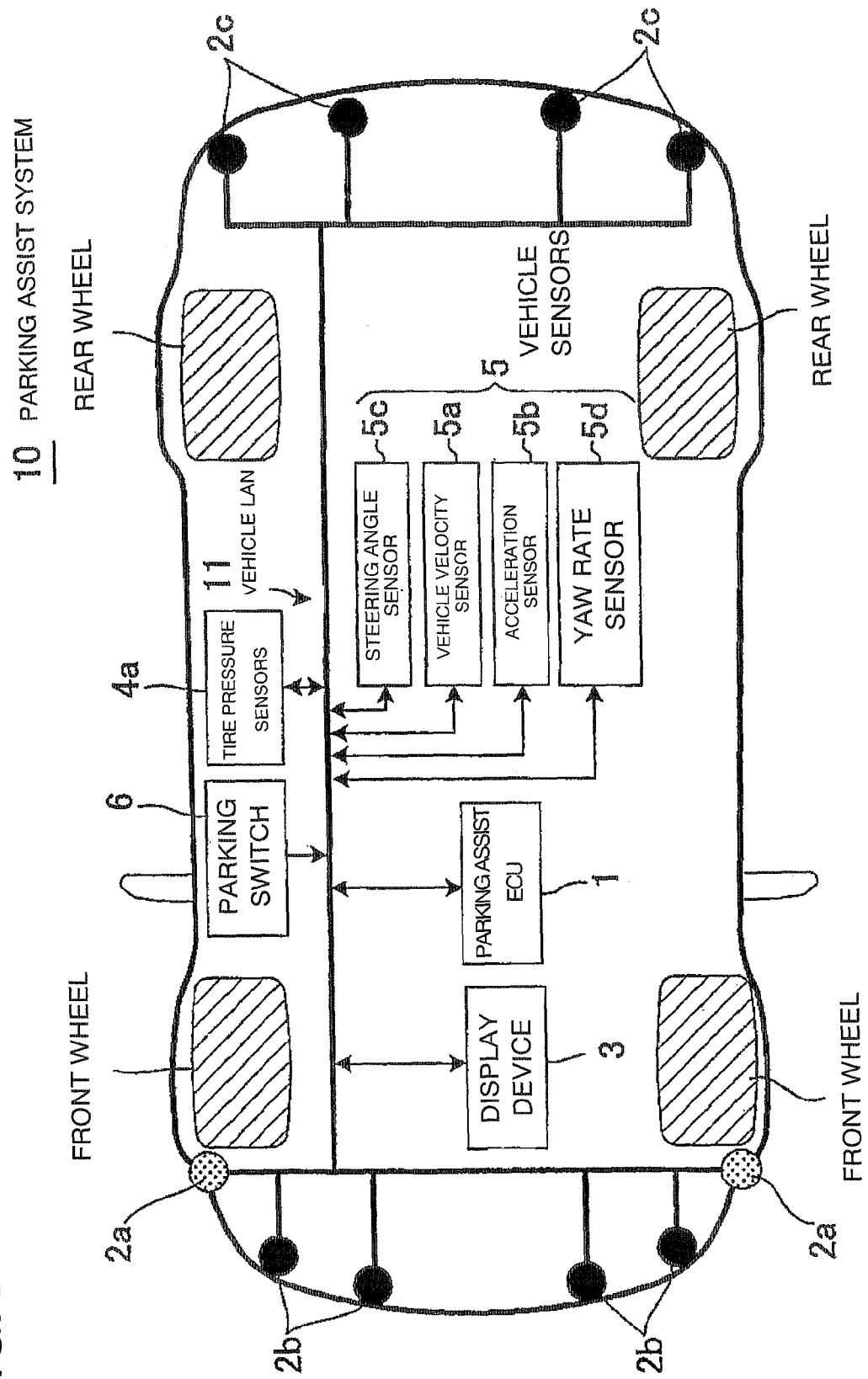
FIG. 2 is a general block diagram showing the hardware configuration of the parking assist system pertaining to the embodiment of the present invention.
Figure 3B:
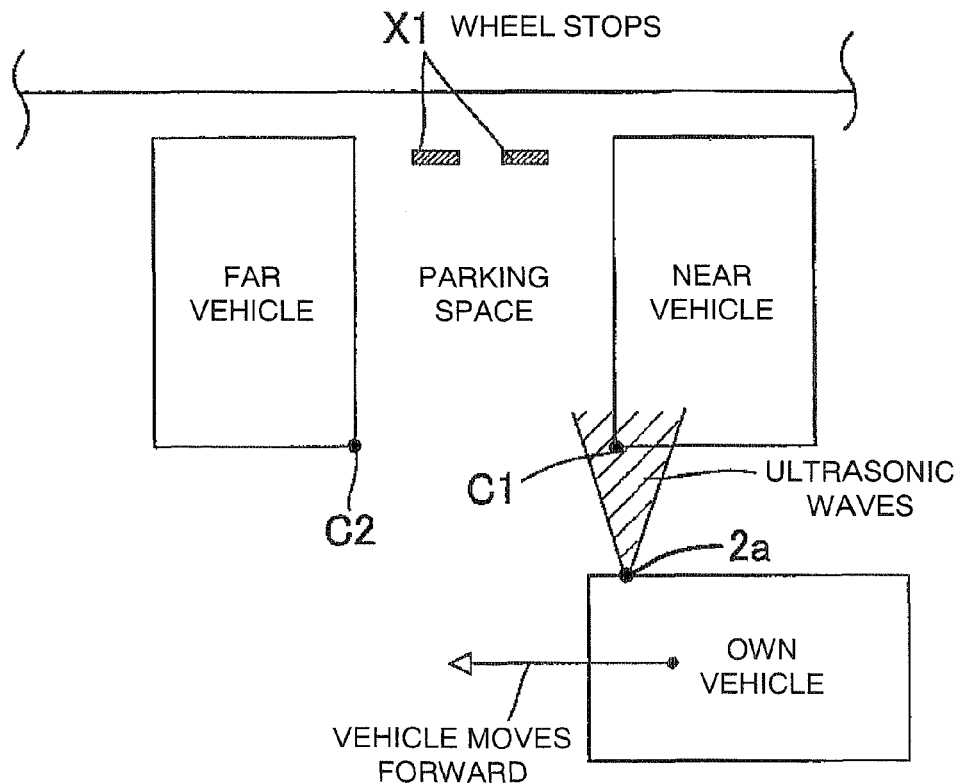
FIG. 3B is a diagram showing an example of a state where a front side ultrasonic sensor detects a corner portion C1 of a near vehicle.
Figure 3C:
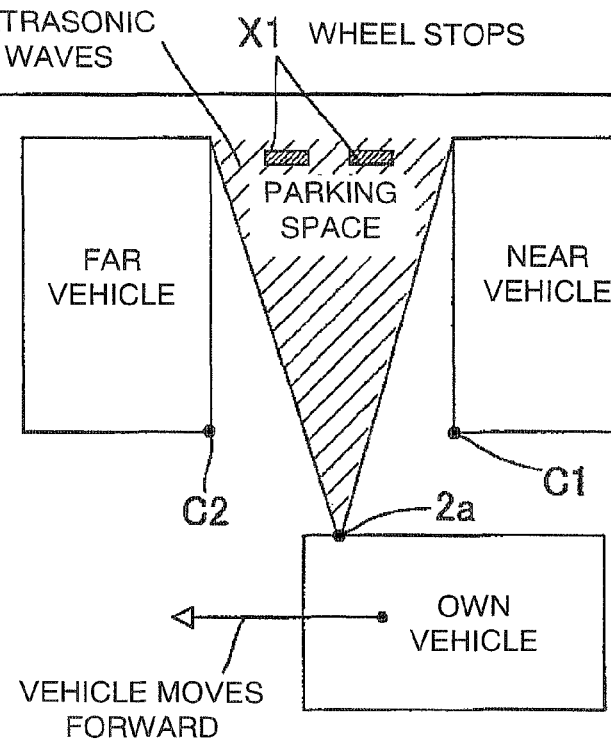
FIG. 3C is a diagram showing an example of a state where the front side ultrasonic sensor detects a pair of wheel stops located in a parking space formed between two vehicles.
Figure 3D:
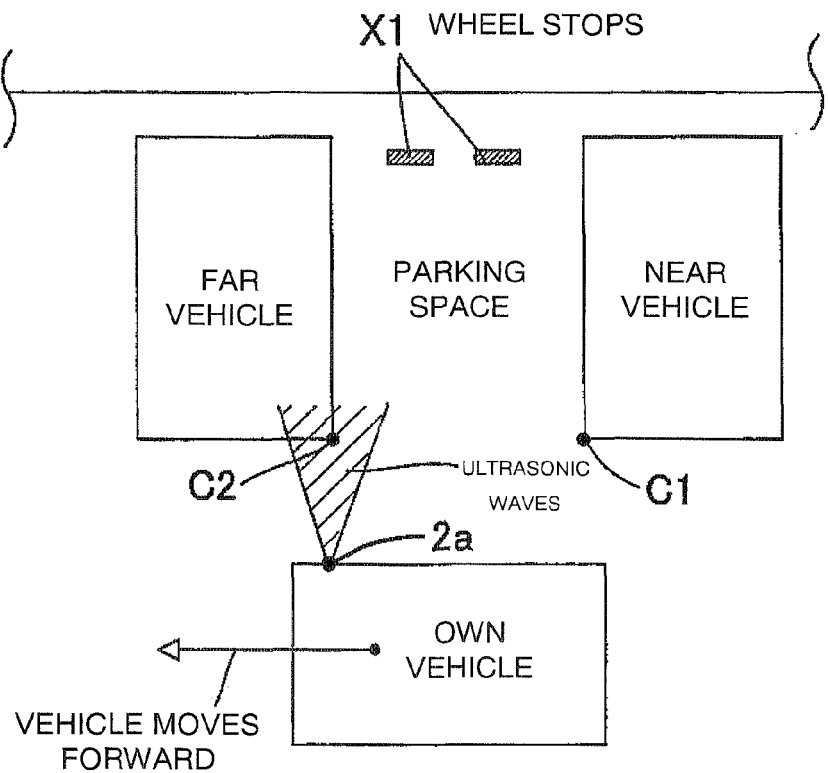
FIG. 3D is a diagram showing an example of a state where the front side ultrasonic sensor detects a corner portion C2 of a far vehicle.

More specifically, a front side ultrasonic sensor 2a (FIG. 2) detects the width of the parking space by detecting, among two vehicles, a front corner portion (inner side) C1 of a vehicle parked on the near side in the traveling direction (hereinafter called "the near vehicle") and a front corner portion (inner side) C2 of a vehicle parked on the far side in the traveling direction across the parking space (hereinafter called "the far vehicle") (FIGS. 3B and 3D). Further, the front side ultrasonic sensor 2a detects the depth of the parking space by detecting wheel stops X1 in the parking space. When there are no wheel stops X1 or when the parking assist system does not perform detection of the wheel stops X1, the parking assist system checks that there are no obstacles in the range of the depth of a standard parking space (e.g., about 5 m) and detects the depth of the parking space as a standard value.

As for the detection of the corner portions C1 and C2, the parking assist system may also be configured to detect the corner portion C1 using the front side ultrasonic sensor 2a and to detect the corner portion C2 by input from the driver. For example, a corner position input button connected to the vehicle LAN 11 may be disposed on an instrument panel near the driver seat. When the corner position input button is pressed, the corner position input button transmits a corner position detection signal to the parking assist ECU 1. Input of the corner position is, for example, performed when the driver presses the corner position input button at a timing when a door mirror of the vehicle coincides with the corner portion C2. Then, the parking assist ECU 1 receives the corner position detection signal and detects the position of the corner portion C2. In this case, detection of the corner portions C1 and C2 is completed at the point in time when the door mirror arrives at the corner portion C2, so the vehicle can be stopped before it passes the parking space and parking assistance processing can be started. Consequently, parking assistance processing can be started at a quicker timing than when using the front side ultrasonic sensor 2a.

Further, the parking assist system may also be configured to detect both of the corner portions C1 and C2 by input from the driver. In this case, it becomes unnecessary to detect the corner portions with the front side ultrasonic sensor 2a, so detection is not affected by error in the measurement resulting from the front side ultrasonic sensor 2a.

The parking assist ECU 1 detects and sets the parking target position as a settable parking space by comparing the depth and the width of the parking space that have been detected with the parking assist system's own vehicle dimensions (total length and width) that are stored beforehand. This processing of detecting and setting the parking space is performed by a parking area detection unit 1a.

The parking target position calculating unit 1b calculates the parking target position of the parking assist system's own vehicle using, as a reference, the positions of the pair of wheel stops X1 that have been detected by the later-described ultrasonic sensors 2 (the front side ultrasonic sensor 2a), for example. More specifically, when the pair of wheel stops X1 are detected by the front side ultrasonic sensor 2a, the parking target position calculating unit 1b calculates the parking target position where the positions of the wheel stops X1 and the positions of the rear wheels of the vehicle coincide. This parking target position calculating unit 1b is realized by a program that is stored in the ROM and executed by the CPU, for example.

When there are no wheel stops X1 or when the parking assist system does not perform detection of the wheel stops X1, the parking target position calculating unit 1b sets the positions of the wheels stops X1 to standard positions such as, for example, about 4 m from the corner portions C1 and C2.

Moreover, the parking assist ECU 1 has a vehicle trajectory calculating unit 1c that calculates vehicle trajectories from a parking assistance start position to the parking target position. The vehicle trajectory calculating unit 1c calculates optimum vehicle trajectories (e.g., vehicle trajectories with the fewest turns) of vehicle trajectories where the vehicle is moved directly backward from the parking assistance start position (a stopped position Y1 in FIG. 3E) to a forward starting position Y2 (FIG. 3E), is moved forward in a direction away from the parking space to a backward starting position Y3 (FIG. 3F), and is moved backward to the parking target position Y5 (FIG. 3G, FIG. 3H). Additionally, the parking assist ECU 1 displays on the display device 3 the vehicle operation instructions by which the parking assist system's own vehicle travels on these calculated vehicle trajectories. FIG. 4 is an example of vehicle operation display displayed on the display device 3; here, the display device 3 is displaying the steering direction and steering amount of the steering wheel. Because of this vehicle operation display displayed on the display device 3, the driver can easily understand the contents of the vehicle operations.

Each of the ultrasonic sensors 2 emits ultrasonic waves to the outer periphery of the vehicle and can detect objects around the vehicle on the basis of the reflected waves. The basic hardware configuration and object detection method of each of the ultrasonic sensors 2 are well-known technologies, so detailed description thereof will be omitted. Further, the ultrasonic sensors 2 have a wheel stop distance calculating unit 2d that calculates the distance from the rear end portion of the vehicle to the wheel stops X1.

The ultrasonic sensors 2 are, for example, configured from four front ultrasonic sensors 2b that are disposed at substantially regular intervals on the front of a front bumper, the pair of left and right front side ultrasonic sensors 2a that are disposed on the sides of the front bumper (near corner portions of the front bumper), and four rear ultrasonic sensors 2c that are disposed at substantially regular intervals on a rear bumper.

The front ultrasonic sensors 2b mainly emit ultrasonic waves in front of the vehicle, whereby they can detect objects located in front of the vehicle. The front side ultrasonic sensors 2a mainly emit ultrasonic waves in front and to the sides of the vehicle, whereby they can detect objects located in front and to the sides of the vehicle. The two front ultrasonic sensors 2b located on the vehicle outer sides of the four front ultrasonic sensors 2b may also be placed so as to emit ultrasonic waves in front and to the sides of the vehicle and configured to detect objects in front and to the sides of the vehicle. In this case, the front side ultrasonic sensors 2a can be omitted.

The front side ultrasonic sensors 2a can, for example, detect the pair of wheel stops X1 located on the road surface of the parking target position (the parking space) formed between two vehicles that are already parked (FIG. 3C). The rear ultrasonic sensors 2c mainly emit ultrasonic waves in back of the vehicle, whereby they can detect objects located in back of the vehicle. The two rear ultrasonic sensors 2c located on the vehicle outer sides of the four rear ultrasonic sensors 2c may also be placed so as to emit ultrasonic waves in back and to the sides of the vehicle and configured to detect objects in back and to the sides of the vehicle.

The wheel stop arrival detection sensors 4 detect that the wheels (e.g., the rear wheels) have arrived at the wheel stops X1. For these wheel stop arrival detection sensors 4, there are used, for example, tire pressure sensors 4a that detect the air pressure inside the tires (FIG. 2). The tire pressure sensors 4a detect that the wheels (e.g., the rear wheels) have arrived at the wheel stops X1. For example, elastic deformation arises in the tires when the tires of the wheels contact the wheel stops X1. The tire pressure sensors 4a detect that the wheels have arrived at the wheel stops X1 on the basis of the change in the air pressure inside the tires that arises because of this elastic deformation of the tires.

The display device 3 is, for example, disposed in a position (in the instrument panel, etc.) where the driver can see it inside the vehicle cabin. Further, the display device 3 can display, to the driver, arbitrary information such as sensor information (outside air temperature, current time) of the parking assist system's own vehicle, position information of the parking assist system's own vehicle, and map information. More specifically, the display device 3 can display the parking target position, the trajectories for guiding the parking assist system's own vehicle to the parking target position, the vehicle operation method for moving the parking assist system's own vehicle to the parking target position, and the distance from the rear end of the vehicle to the wheel stops X1 that has been calculated by the wheel stop distance calculating unit 2d. For the display device 3, arbitrary display means such as a liquid crystal display or an organic EL display, for example, is applicable.

The vehicle sensors 5 detect state quantities of the vehicle (vehicle velocity, acceleration (longitudinal acceleration, lateral acceleration, etc.), steering angle, yaw rate). As the vehicle sensors 5, there are included, for example, a vehicle velocity sensor 5a that detects the vehicle velocity, an acceleration sensor 5b that detects the acceleration of the vehicle, a steering angle sensor 5c that detects the steering angle of the vehicle, and a yaw rate sensor 5d that detects the yaw rate of the vehicle.

The parking assist ECU 1 may also be configured to calculate displacement between the calculated vehicle trajectories and the current position of the vehicle on the basis of the state quantities of the vehicle that have been detected by the vehicle sensors, correct this displacement, and recalculate vehicle trajectories that will guide the vehicle to the parking target position.

The parking switch 6 is a switch for detecting whether or not the driver intends to park the parking assist system's own vehicle in the parking target position. The parking switch 6 is, for example, an ON/OFF switch and is disposed on the instrument panel near the driver is seat. When the parking switch 6 is switched ON, it outputs an ON signal. The parking assist ECU 1 recognizes that the driver intends to park the vehicle when it receives the ON signal from the parking switch 6. Further, when the parking switch 6 is switched OFF, it outputs an OFF signal. The parking assist ECU 1 recognizes that the driver does not intend to park the vehicle when it receives the OFF signal from the parking switch 6.

Figure 5A:
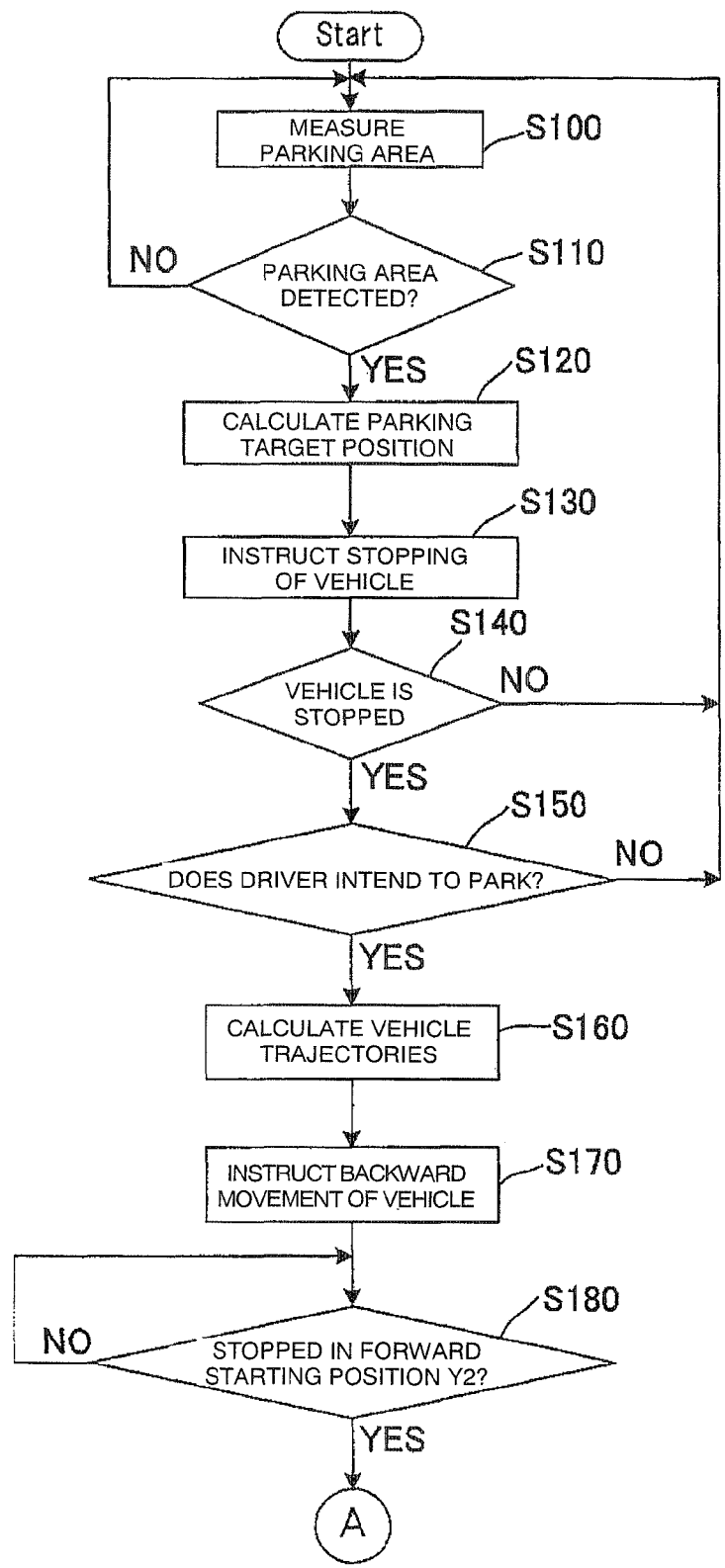
FIG. 5A is a flowchart showing an example of a control flow of the parking assist system pertaining to the embodiment of the present invention.
Figure 5B:
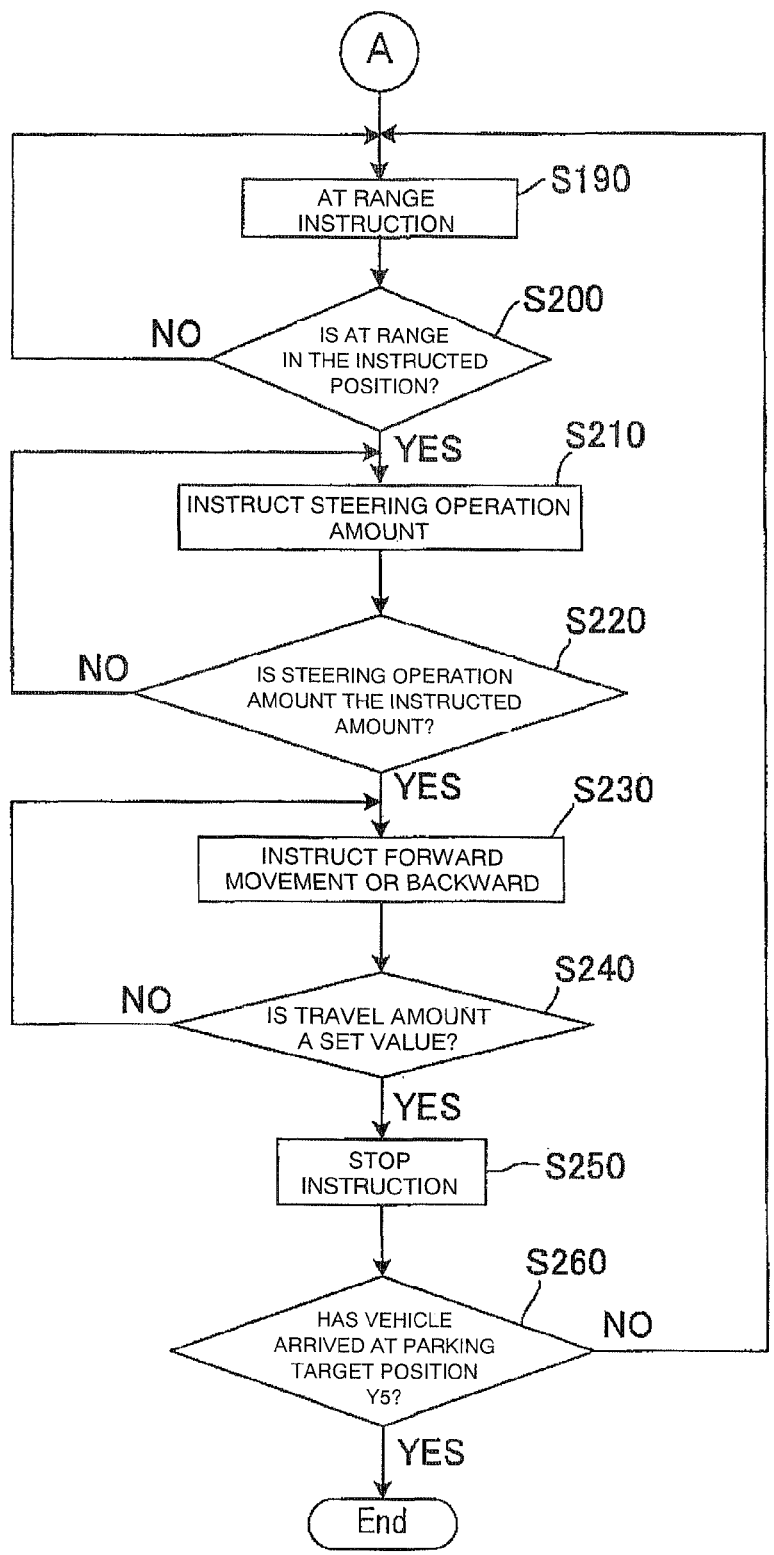
FIG. 5B is a flowchart showing an example of the control flow of the parking assist system pertaining to the embodiment of the present invention.

Next, a control method of the parking assist system 10 pertaining to the embodiment of the present invention will be described in detail. FIG. 5A and FIG. 5B are flowcharts showing an example of a control flow of the parking assist system 10 pertaining to the embodiment of the present invention. The control flow shown in FIG. 5A and FIG. 5B is repeatedly executed every predetermined minute time period (e.g., about 100 msec), for example.

For example, as shown in FIG. 3A, while the parking assist system's own vehicle is moved forward inside a parking lot, the ultrasonic sensors 2 detect objects around the vehicle and measure a parking space (a parking area) having the potential for the parking assist system's own vehicle to park in (S100).

Figure 3E:
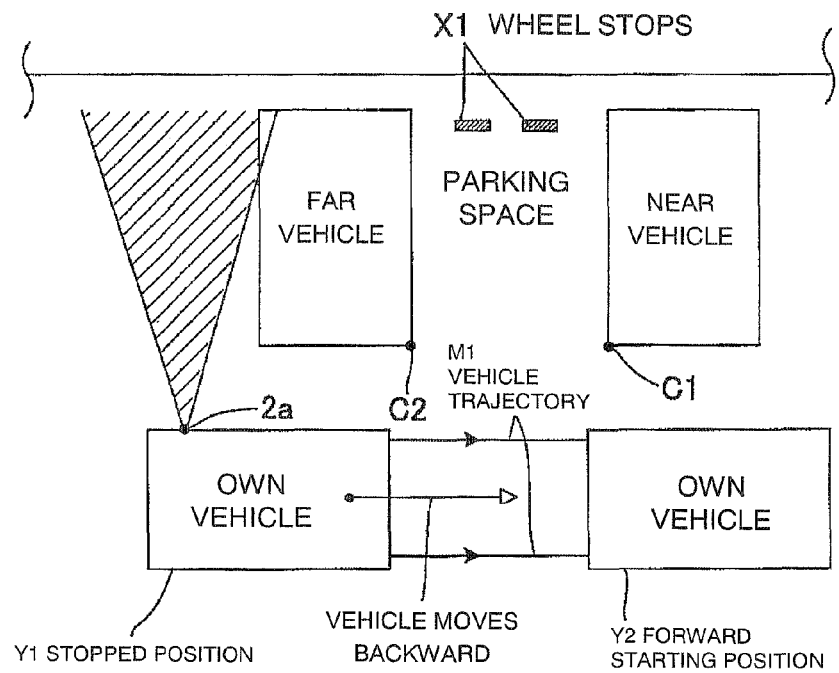
FIG. 3E is a diagram showing an example of a state of calculating vehicle trajectories to a parking target position and moving the parking assist system's own vehicle directly backward to a forward starting position.
Figure 4:
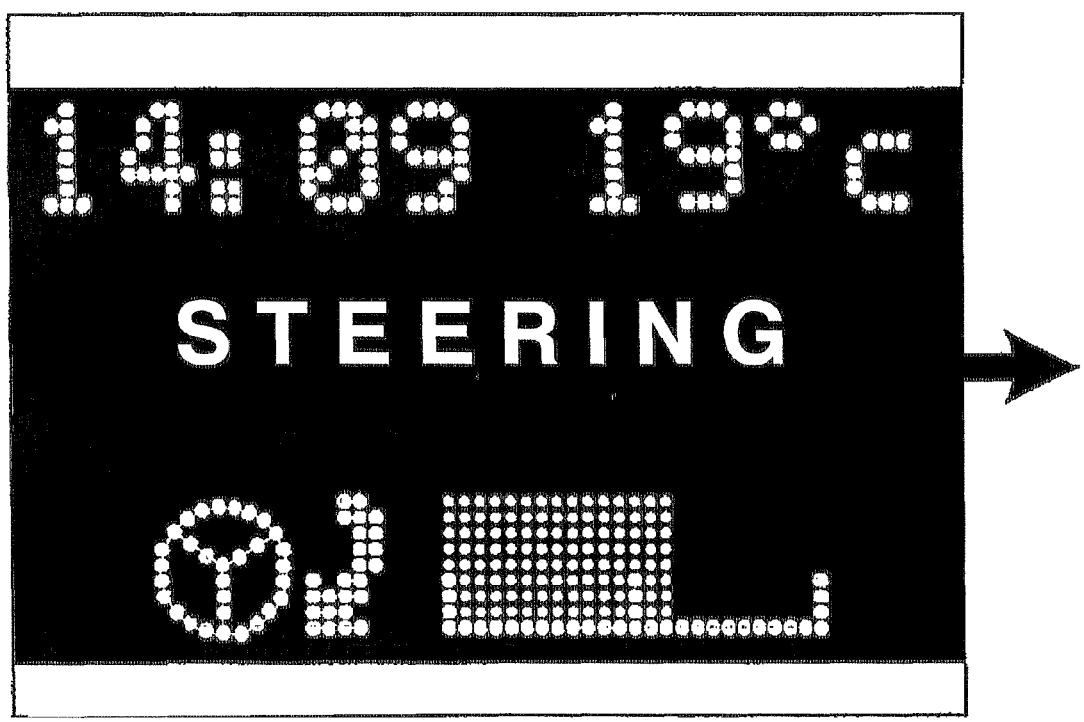
FIG. 4 is an example of vehicle operation display displayed on a display device and is a diagram showing a steering direction and a steering amount.

At this time, when the parking assist system's own vehicle passes the side of the parking space, as shown in FIGS. 3B to 3D, the front side ultrasonic sensor 2a detects the corner portion C1 of the near vehicle, detects the pair of wheel stops X1 located in the parking space formed between the two vehicles, and detects the corner portion C2 of the far vehicle (S100), and the vehicle is stopped in the position shown in FIG. 3E after the parking assist system's own vehicle has passed the side of the parking space (S130 described later). The parking assist system may also receive from the driver the position of at least one of the corner portions C1 and C2 as described previously.

The parking space between the vehicles has a depth of about 5 m, for example, and the pair of wheel stops X1 are disposed sticking out on the far side on the road surface.

The parking assist system calculates the width and the depth of the parking space on the basis of the corner portions C1 and C2 and the pair of wheel stops X1 and compares the calculated width and depth of the parking space with the dimensions (total length and width) of the parking assist system's own vehicle, and when a parking space in which the parking assist system's own vehicle can park has been detected (YES in S110), the parking target position calculating unit 1b of the parking assist ECU 1 calculates the parking target position Y5 (FIG. 3H) using, as a reference, the positions of the pair of wheel stops X1 that have been detected by the front side ultrasonic sensor 2a (S120). On the other hand, when a parking space is not detected (NO in S110), the parking assist ECU 1 returns to the processing of S100.

When there are no wheel stops X1 and when the parking assist system does not perform processing to detect the wheel stops X1, when the corner portions C1 and C2 have been detected by the front side ultrasonic sensor 2a (S100), the parking assist system performs parking space detection. Specifically, the parking assist system determines the width of the parking space from the positions of the corner portions C1 and C2, sets the depth of the parking space to a standard value, compares the width and the depth of the parking space with the dimensions (total length and width) of the parking assist system's own vehicle, and detects a parking space in which the parking assist system's own vehicle can park (YES in S110). When the parking assist system has detected a parking space in which the parking assist system's own vehicle can park, the parking target position calculating unit 1b of the parking assist ECU 1 calculates the parking target position Y5 (FIG. 3H) using, as a reference, standard positions of the wheel stops X1 (S120).

When the parking target position Y5 is calculated, the parking assist ECU 1 instructs the driver to stop the parking assist system's own vehicle (S130). When the parking assist system's own vehicle is stopped as in FIG. 3E (YES in S140), the parking assist ECU 1 prompts the driver to input, from the parking switch 6, whether or not the driver intends to park the vehicle in the detected parking target position Y5. In FIG. 3E, the position in which the parking assist system's own vehicle has been stopped is represented by the stopped position Y1. When the parking assist system's own vehicle does not stop, the parking assist ECU 1 returns to the processing of S100.

The parking assist ECU 1 receives the signal from the parking switch 6 and judges whether or not the driver intends to park the vehicle (S150).

When the parking assist ECU 1 receives the ON signal from the parking switch 6 and judges that the driver intends to park the vehicle (YES in S150), the parking assist ECU 1 calculates, on the basis of the parking target position Y5 that has been calculated by the parking target position calculating unit 1b, vehicle trajectories from the current position of the parking assist system's own vehicle (e.g., the stopped position Y1) to the parking target position Y5 as indicated by vehicle trajectories M1 to M4 in FIGS. 3E to 3H (S160). The method of calculating the vehicle trajectories is a well-known technology, so detailed description thereof will be omitted.

Further, the parking assist ECU 1 calculates vehicle operations (e.g., brake pedal ON/OFF, steering wheel steering angle, shift lever position (AT range position), etc.), by which the parking assist system's own vehicle travels on the calculated vehicle trajectories, and appropriately displays those vehicle operations on the display device 3 as shown in FIG. 4 (S170 to S260 of FIGS. 5A and 5B). Thus, the driver can easily park the parking assist system's own vehicle in the parking target position simply by performing the vehicle operations in accordance with the vehicle operations displayed on the display device 3. The parking assist ECU 1 may also be configured to display on the display device 3 the distance from the rear end of the vehicle to the wheel stops X1 that has been calculated by the wheel stop distance calculating unit 2d of the rear ultrasonic sensors 2c. Thus, the driver can grasp the general distance from the rear end of the vehicle to the wheel stops X1, so this is convenient and safe. When it is detected by the tire pressure sensors 4a that the rear wheels have arrived at the wheel stops X1, the parking assist ECU 1 may also perform display control to display an indication thereof on the display device 3.

On the other hand, in S150, when the parking assist ECU 1 does not receive the ON signal from the parking switch 6 (when it is receiving the OFF signal) and judges that the driver does not intend to park the vehicle (No in S150), the parking assist ECU 1 returns to the processing of S100.

Next, the ECU 1 instructs the driver to move the parking assist system's own vehicle directly backward (S170) so that, as shown in FIG. 3E, the parking assist system's own vehicle is moved backward on the vehicle trajectory M1 to the forward starting position Y2 and is stopped.

Figure 3F:
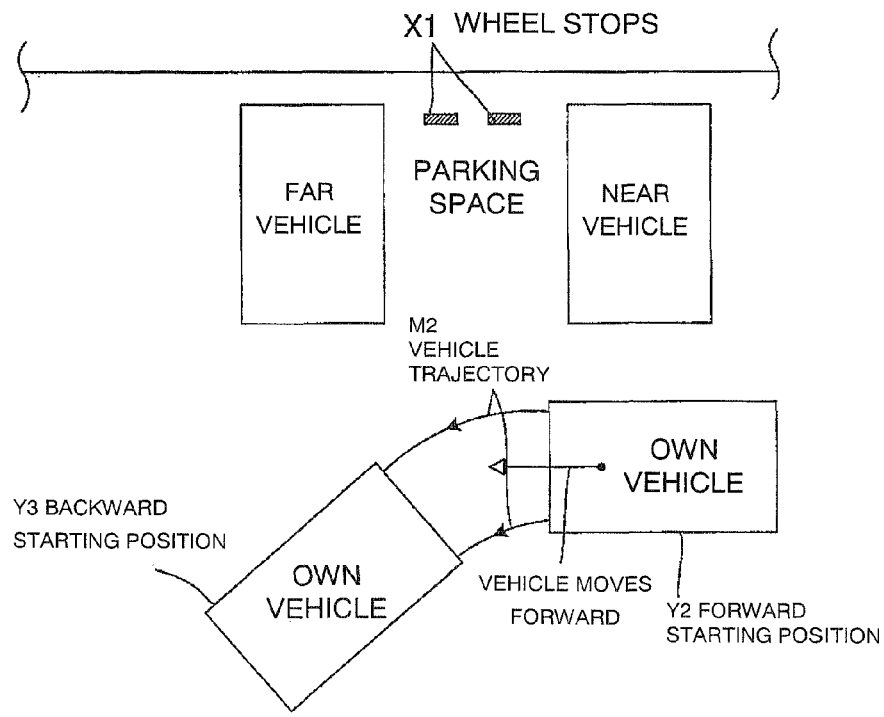
FIG. 3F is a diagram showing an example of a state of moving the parking assist system's own vehicle forward from the forward starting position to a backward starting position.
Figure 3G:
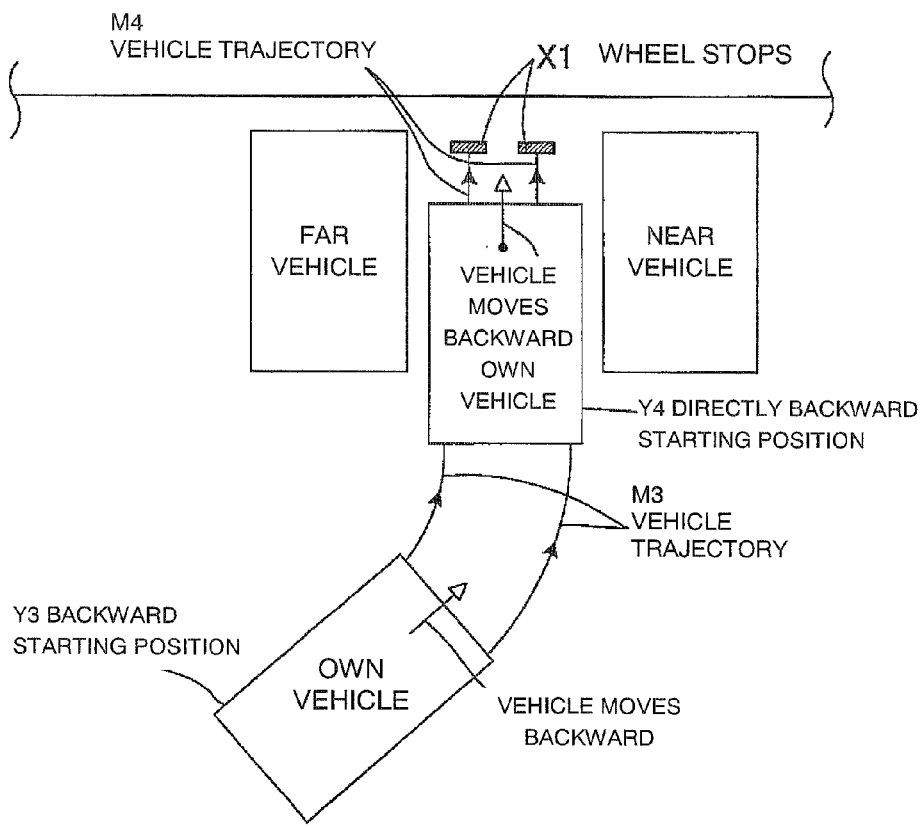
FIG. 3G is a diagram showing an example of a state of moving the parking assist system's own vehicle backward from the backward starting position to a directly backward starting position.
Figure 3H:
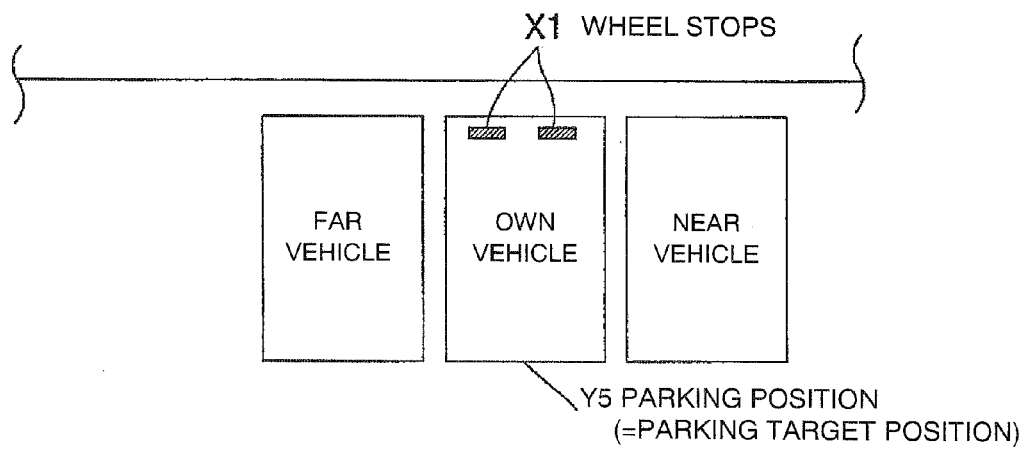
FIG. 3H is a diagram showing an example of a state of moving the parking assist system's own vehicle from the directly backward starting position to the parking target position.

When the parking assist system's own vehicle stops in the forward starting position Y2 (YES in S180), the parking assist ECU 1 instructs the driver to operate the AT range to the D range position (S190). When the AT range has been moved to the D range position (instruction position) (YES in S200), the parking assist ECU 1 instructs the driver of a steering operation amount (S210). Then, when the steering operation amount has been operated in the instructed amount (S220), the parking assist ECU 1 instructs the driver to move the parking assist system's own vehicle forward (S230). In accordance with this, the driver moves the parking assist system's own vehicle from the forward starting position Y2 on the vehicle trajectory M2 to the backward starting position Y3 as shown in FIG. 3F.

When the travel amount of the parking assist system's own vehicle has arrived at a set value (a travel amount from the forward starting position Y2 on the vehicle trajectory M2 to the backward starting position Y3) (YES in S240), the parking assist ECU 1 instructs the driver to stop the parking assist system's own vehicle (S250). In accordance with this, the driver stops the parking assist system's own vehicle in the backward starting position Y3 shown in FIG. 3F. At this time, it is judged whether or not the vehicle position is the parking target position Y5, but because the vehicle position is not the parking target position Y5, the parking assist ECU 1 returns to S190 (NO in S260).

In the backward starting position Y3, the ECU 1 instructs the driver to operate the AT range to the R range position (S190). When the AT range has been moved to the R range position (YES in S200), the parking assist ECU 1 instructs the driver of a steering operation amount (S210). Then, when the steering operation amount has been operated in the instructed amount (S220), the parking assist ECU 1 instructs the driver to move the parking assist system's own vehicle backward (S230). In accordance with this, the driver moves the parking assist system's own vehicle from the backward starting position Y3 on the vehicle trajectory M3 to a directly backward starting position Y4 as shown in FIG. 3G.

When the travel amount of the parking assist system's own vehicle has arrived at a set value (a travel amount from the backward starting position Y3 on the vehicle trajectory M3 to the directly backward starting position Y4) (YES in S240), the parking assist ECU 1 instructs the driver to stop the parking assist system's own vehicle (S250). In accordance with this, the driver stops the parking assist system's own vehicle in the directly backward starting position Y4 shown in FIG. 3G. At this time, it is judged whether or not the vehicle position is the parking target position Y5, but because the vehicle position is not the parking target position Y5, the parking assist ECU 1 returns to S190 (NO in S260).

In the directly backward starting position Y4, the ECU 1 instructs the driver to operate the AT range to the R range position (S190). At this time, the AT range is in the R range position, so the parking assist ECU 1 checks that the AT range is the R range position (YES in S200) and thereafter instructs the driver of a steering operation amount (S210). Here, the parking assist ECU 1 instructs the driver such that the steering angle becomes zero because the parking assist system's own vehicle will be moved directly backward. When steering has been directly returned (S220), the parking assist ECU 1 instructs the driver to move the parking assist system's own vehicle backward (S230). In accordance with this, the driver moves the parking assist system's own vehicle from the directly backward starting position Y4 on the vehicle trajectory M4 to the parking target position Y5 as shown in FIG. 3G and FIG. 3H.

When the travel amount of the parking assist system's own vehicle has arrived at a set value (a travel amount from the directly backward starting position Y4 on the vehicle trajectory M4 to the parking target position Y5) (YES in S240), the parking assist ECU 1 instructs the driver to stop the parking assist system's own vehicle (S250). The parking assist ECU 1 may also give an instruction to stop the parking assist system's own vehicle on the basis of the detection signals from the tire pressure sensors 4a. In accordance with this, the driver stops the parking assist system's own vehicle in the parking target position Y5 of FIG. 3H. Thus, the parking assist system's own vehicle is parked in the parking target position Y5 and ends processing (YES in S260).

As described above, in the parking assist system pertaining to the present embodiment, when the parking assist system's own vehicle passes the side of a parking space (a parking area), the parking assist system detects the parking space, and after the parking assist system's own vehicle has passed the side of the parking space, the parking assist system is own vehicle is stopped. Then, the parking assist system's own vehicle is moved directly backward, is then moved forward (poking out) in a direction away from the parking space, and is then moved backward and guided into the parking space.

Consequently, the parking assist system detects the parking space when the parking assist system's own vehicle passes the side of the parking space, so the precision of detecting the corner position of a parked vehicle is high and the parking assist system can accurately detect the parking space.

Further, the parking assist system's own vehicle is first poked out and is then moved backward and parked, so there are few affects of overhang and parking assistance is easy even when the parking space is narrow and small.

The present invention has been described above with reference to an exemplary embodiment, but it will be understood by those skilled in the art that various changes may also be done and that various elements may also be replaced with equivalents without departing from the scope of the present invention. Moreover, many changes can be done and particular situations or materials can be adapted with respect to the teachings of the present invention without departing from the gist of the present invention. Consequently, the present invention is not intended to be limited to the particular embodiment disclosed as the best mode contemplated for implementation, and the present invention includes all embodiments in the category of the scope of the claims.

For example, in the above-described embodiment, the ultrasonic sensors 2 are used as the distance sensors, but the distance sensors are not limited to these; for example, radar sensors such as millimeter wave sensors or microwave sensors may also be used. Further, six of the distance sensors were disposed on the front bumper and four of the distance sensors were disposed on the rear bumper, but as long as the distance sensors can appropriately detect parking areas, the numbers of the distance sensors disposed on the front and rear bumpers may be arbitrary, and the positions where the distance sensors are disposed may also be arbitrary.

In the above-described embodiment, the parking assist ECU 1 performs parking assistance to park the vehicle in the parking space formed between the two vehicles (the near vehicle and the far vehicle), but the vehicle trajectories on which the parking assist system's own vehicle is moved directly backward, is then moved forward (poking out) in a direction away from the parking space, and is then moved backward and guided into the parking space can also be applied to cases where the vehicle is to be parked in a parking space formed by only the near vehicle, a parking space formed by only the far vehicle, or a parking space formed by only parking stripes.

Figure 6:
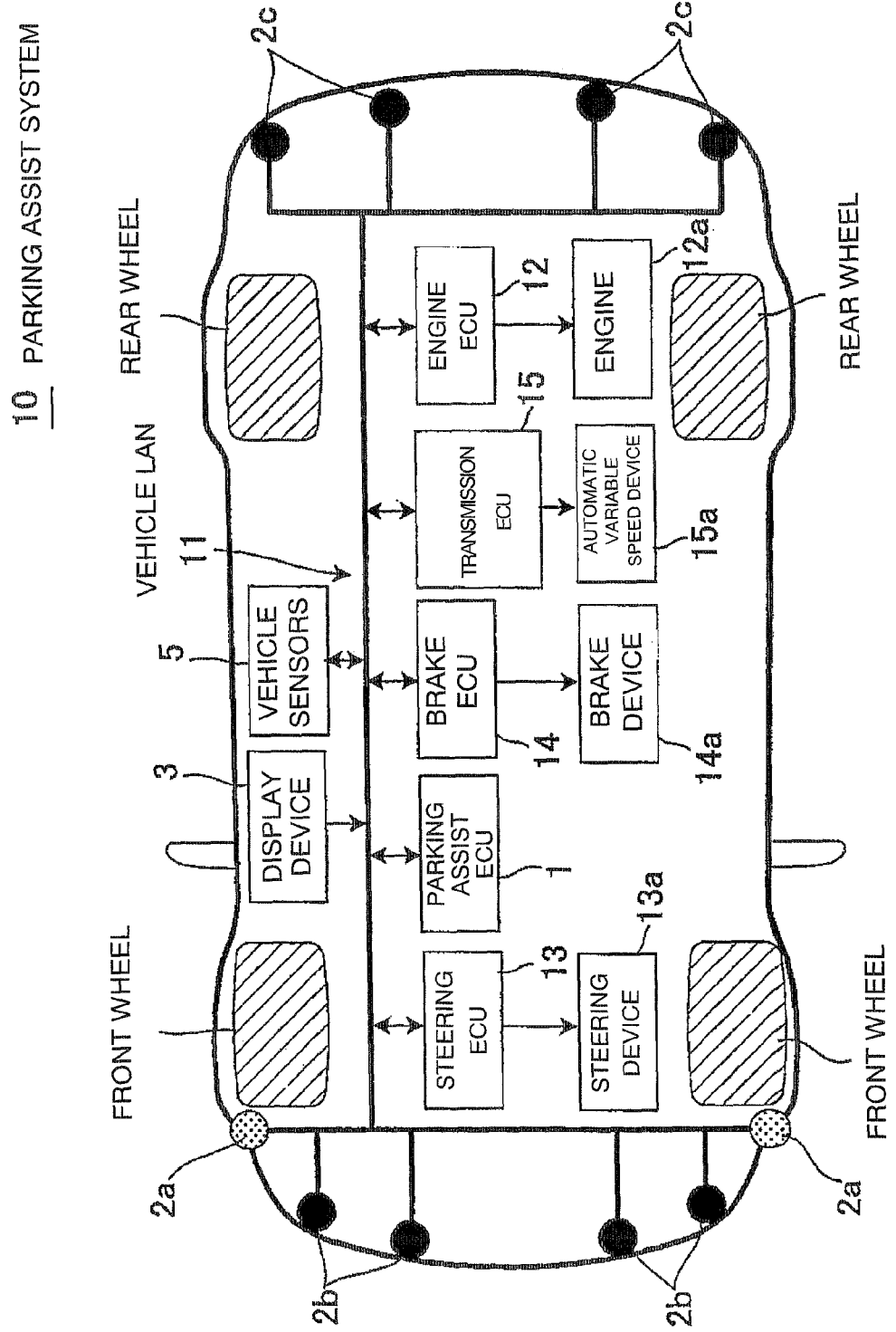
FIG. 6 is a general block diagram showing a hardware configuration when the parking assist system pertaining to the embodiment of the present invention performs automatic control.

Further, in the above-described embodiment, the parking assist ECU 1 may also perform automatic control to automatically park the parking assist system's own vehicle in the parking target position on the basis of the parking area that has been detected by the ultrasonic sensors 2. In this case, the parking assist ECU 1 may also perform automatic control to automatically park the parking assist system's own vehicle in the parking target position by calculating vehicle trajectories and a vehicle control procedure that guide the parking assist system's own vehicle to the parking target position and, as shown in FIG. 6, controlling an engine ECU 12 that controls the drive force of the parking assist system's own vehicle, a steering ECU 13 that controls the steering of the parking assist system's own vehicle, a brake ECU 14 that controls the brake force of the parking assist system's own vehicle, and a transmission ECU 15 that controls the variable speed position of the parking assist system's own vehicle.

The engine ECU 12 controls the drive force of the parking assist system's own vehicle by controlling the output (fuel injection amount, intake air amount, etc.) of an engine 12a. Further, the steering ECU 13 controls the steering direction and steering force of the parking assist system's own vehicle by controlling a steering device (power steering device) 13a of the parking assist system's own vehicle. Moreover, the transmission ECU 15 controls the variable speed position of the parking assist system's own vehicle by controlling an automatic variable speed device 15a of the parking assist system's own vehicle. The brake ECU 14 controls the brake force of the parking assist system's own vehicle by controlling disc brake devices 14a disposed in each of the wheels.

In the above-described embodiment, the tire pressure sensors 4a that detect the air pressure inside the tires are used as the wheel stop arrival detection sensors 4, but the wheel stop arrival detection sensors are not limited to this; for example, arbitrary vehicle sensors 5 such as the acceleration sensor 5*b* that detects the acceleration of the vehicle and the vehicle velocity sensor 5*a* that detect the vehicle velocity may also be used.

In the above-described embodiment, the parking assist ECU 1 performs driver parking assistance by displaying on the display device 3 vehicle operations to the parking target position, but the parking assist ECU 1 is not limited to this; for example, the parking assist ECU 1 may also use an audio output device (on-board audio) to output audio vehicle operations to the parking target position. Further, the parking assist ECU 1 may also instruct the driver of the vehicle operations and the like and perform driver parking assistance by using a vibration device built into the seat or the steering wheel to vibrate portions that the driver touches. Moreover, the parking assist ECU 1 may also perform parking assistance by arbitrarily combining the display device, the audio output device and the vibration device.

The invention claimed is:

1. A parking assist system which, after a vehicle has passed the side of a parking area formed between parked vehicles, assists parking of the vehicle from a stopped position of the vehicle to the parking area, the parking assist system comprising:
   a distance sensor that emits radio waves or ultrasonic waves and detects a distance to the parked vehicles based on reflected waves;
   parking area detecting means that measures, when the vehicle passes the parked vehicles and a side of the parking area, the distance to the parked vehicles with the distance sensor and detects, after the vehicle has passed the side of the parking area, the parking area based on a measurement result from the distance sensor;
   parking target position calculating means that calculates a parking target position of the vehicle based on the parking area that has been detected by the parking area detecting means; and
   vehicle trajectory calculating means that calculates, based on the parking target position of the vehicle that has been calculated by the parking target position calculating means, vehicle trajectories from a stopped position where the vehicle has stopped to the parking target position.

2. The parking assist system according to claim 1, wherein the parking area detecting means detects, based on the measurement result resulting from the distance sensor, first and second corner portions positioned on the parking area side of two parked vehicles located on both sides of the parking area and detects the parking area based on the positions of the first and second corner portions.

3. The parking assist system according to claim 1, wherein the vehicle trajectory calculating means calculates vehicle trajectories on which the vehicle is moved directly backward from the stopped position and is then guided to the parking target position.

4. The parking assist system according to claim 2, wherein the vehicle trajectory calculating means calculates vehicle trajectories on which the vehicle is moved directly backward from the stopped position and is then guided to the parking target position.

5. The parking assist system according to claim 3, wherein the vehicle trajectory calculating means calculates vehicle trajectories on which the vehicle is moved directly backward from the stopped position, is then moved forward in a direction away from the parking area, and is then moved backward and guided to the parking target position.

6. The parking assist system according to claim 4, wherein the vehicle trajectory calculating means calculates vehicle trajectories on which the vehicle is moved directly backward from the stopped position, is then moved forward in a direction away from the parking area, and is then moved backward and guided to the parking target position.

7. The parking assist system according to claim 1, wherein the parking assist system calculates vehicle operations, by which the vehicle travels on the calculated vehicle trajectories, and gives vehicle operation instructions to the driver based on the vehicle operations.

8. The parking assist system according to claim 1, wherein the parking assist system calculates a vehicle control procedure, by which the vehicle travels on the calculated vehicle trajectories, and automatically guides the vehicle to the parking target position based on the vehicle control procedure.

9. The parking assist system according to claim 1, further comprising wheel stop detecting means disposed in a side portion of the vehicle and which detects wheel stops disposed inside the parking area, wherein the parking target position calculating means calculates the parking target position of the vehicle based on the parking area that has been detected by the parking area detecting means and positions of the wheel stops that have been detected by the wheel stop detecting means.

10. A parking assist system which, while a vehicle is passing or after the vehicle has passed a side of a parking area formed between parked vehicles, assists parking of the vehicle from a stopped position of the vehicle to the parking area, the parking assist system comprising:
    parking area detecting means that detects, while the vehicle is passing the parking area, the parking area by receiving from a driver a position of at least one of first and second corner portions positioned on inner sides of two parked vehicles located on both sides of the parking area;
    parking target position calculating means that calculates a parking target position of the vehicle based on the parking area that has been detected by the parking area detecting means; and
    vehicle trajectory calculating means that calculates, based on the parking target position of the vehicle that has been calculated by the parking target position calculating means , vehicle trajectories on which the vehicle is moved directly backward from a stopped position where the vehicle has stopped and is then guided to the parking target position.

11. The parking assist system according to claim 10, further comprising a distance sensor that emits radio waves or ultrasonic waves and detects a distance to the parked vehicles based on reflected waves, wherein the parking area detecting means receives from the driver the position of the first corner portion, detects the position of the second corner portion based on a measurement result resulting from the distance sensor, and detects the parking area based on the positions of the first and second corner portions.

12. The parking assist system according to claim 10, wherein the parking area detecting means receives from the driver the positions of the first and second corner portions and detects the parking area based on the positions of the first and second corner portions.

13. The parking assist system according to claim 10, wherein the vehicle trajectory calculating means calculates vehicle trajectories on which the vehicle is moved directly backward from the stopped position, is then moved forward in a direction away from the parking area, and is then guided to the parking target position.

14. The parking assist system according to claim 11, wherein the vehicle trajectory calculating means calculates vehicle trajectories on which the vehicle is moved directly backward from the stopped position, is then moved forward in a direction away from the parking area, and is then guided to the parking target position.

15. The parking assist system according to claim 12, wherein the vehicle trajectory calculating means calculates vehicle trajectories on which the vehicle is moved directly backward from the stopped position, is then moved forward in a direction away from the parking area, and is then guided to the parking target position.

16. A parking assist system which, after a vehicle has passed a side of a parking area formed between parked vehicles, assists parking of the vehicle from a stopped position of the vehicle to the parking area, the parking assist system comprising:
    parking area detecting means that detects the parking area while the vehicle is passing or after the vehicle has passed the side of the parking area;
    parking target position calculating means that calculates a parking target position of the vehicle based on the parking area that has been detected by the parking area detecting means; and
    vehicle trajectory calculating means that calculates, based on the parking target position of the vehicle that has been calculated by the parking target position calculating means, vehicle trajectories on which the vehicle is moved directly backward from a stopped position where the vehicle has stopped and is then guided to the parking target position.

17. The parking assist system according to claim 16, wherein the vehicle trajectory calculating means calculates vehicle trajectories on which the vehicle is moved directly backward from the stopped position, is then moved forward in a direction away from the parking area, and is then moved backward and guided to the parking target position.

18. A control method of a parking assist system which, after a vehicle has passed a side of a parking area formed between parked vehicles, assists parking of the vehicle from a stopped position of the vehicle to the parking area, the method comprising:
    a parking area detecting step where parking area detecting means measures, when the vehicle passes the parked vehicles and the side of the parking area, a distance to the parked vehicles with a distance sensor and detects, after the vehicle has passed the side of the parking area, the parking area based on a measurement result of the distance sensor;
    a parking target position calculating step where parking target position calculating means calculates a parking target position of the vehicle based on the parking area that has been detected by the parking area detecting means; and
    a vehicle trajectory calculating step where vehicle trajectory calculating means calculates, based on the parking target position of the vehicle that has been calculated by the parking target position calculating means, vehicle trajectories from a stopped position where the vehicle has stopped to the parking target position.

19. A control method of a parking assist system which, while a vehicle is passing or after the vehicle has passed a side of a parking area formed between parked vehicles, assists parking of the vehicle from a stopped position of the vehicle to the parking area, the method comprising:
    a parking area detecting step where parking area detecting means detects, while the vehicle is passing the parking area, the parking area by receiving from a driver a position of at least one of first and second corner portions positioned on inner sides of two parked vehicles located on both sides of the parking area;
    a parking target position calculating step where parking target position calculating means calculates a parking target position of the vehicle based on the parking area that has been detected by the parking area detecting means; and
    a vehicle trajectory calculating step where vehicle trajectory calculating means calculates, based on the parking target position of the vehicle that has been calculated by the parking target position calculating means, vehicle trajectories on which the vehicle is moved directly backward from a stopped position where the vehicle has stopped and is then guided to the parking target position.

20. A control method of a parking assist system which, after a vehicle has passed a side of a parking area formed between parked vehicles, assists parking of the vehicle from a stopped position of the vehicle to the parking area, the method comprising:
    a parking area detecting step where parking area detecting means detects the parking area while the vehicle is passing or after the vehicle has passed the side of the parking area;
    a parking target position calculating step where parking target position calculating means calculates a parking target position of the vehicle based on the parking area that has been detected by the parking area detecting means; and
    a vehicle trajectory calculating step where vehicle trajectory calculating means calculates, based on the parking target position of the vehicle that has been calculated by the parking target position calculating means, vehicle trajectories on which the vehicle is moved directly backward from a stopped position where the vehicle has stopped and is then guided to the parking target position.

* * * * *